Feb. 2, 1971     G. M. CRAIG     3,560,265
GALVANIC CELL WITH A MATRIX ELECTRODE
Filed July 8, 1968     2 Sheets-Sheet 1

INVENTOR.
Gale M. Craig
BY
Lawrence B. Plant
ATTORNEY

Feb. 2, 1971          G. M. CRAIG          3,560,265
GALVANIC CELL WITH A MATRIX ELECTRODE
Filed July 8, 1968                        2 Sheets-Sheet 2

INVENTOR.
Gale M. Craig
BY
Lawrence B. Plant
ATTORNEY

United States Patent Office 3,560,265
Patented Feb. 2, 1971

3,560,265
GALVANIC CELL WITH A MATRIX ELECTRODE
Gale M. Craig, Anderson, Ind., assignor to General Motors Corporation, Detroit, Mich., a corporation of Delaware
Filed July 8, 1968, Ser. No. 743,170
Int. Cl. H01m 27/00
U.S. Cl. 136—86                                8 Claims

ABSTRACT OF THE DISCLOSURE

A matrix electrode for the molten lithium of a

Li|LiCl|Cl$_2$ fuel cell, which electrode is a porous bundle of specifically oriented filaments of a material which is preferentially wetted by the lithium. A particular filament bundle has spacer filaments intermittently disposed between layers of woven or meshed filaments. A simply sealed battery of cells having matrix electrodes is described.

---

This invention relates generally to electrochemical cells, such as fuel cells, or batteries thereof, wherein at least one of the constituents of the cell's electrochemical couple is a liquid reactant. More particularly, this invention relates to electrodes for use with these cells. By the expression electrochemical couple is meant the cell's reactants which combine galvanically on cell discharge or are produced electrolytically during cell recharge.

Containing liquid reactants in porous electrode matrices in galvanic cells is generally known. For ideal discharge of such cells the reactant should feed, by capilliary action toward the surface of the electrode nearest he counter-electrode and the void left in the wake of the feeding reactant should be progressively filled with electrolyte. Under such ideal operation, the ionic current path is a constant during the discharge cycle of the cell. Likewise, a more efficient use of available space is realized in those cells where the electrolyte is itself the product of the electrochemical reaction. Heretofore, fiber metal sponges have been used as electrodes in fused salt electrolyte systems. The fiber metal sponges have consisted of short, small diametered, randomly oriented, pressed and sintered fibers. These sponges do not have a high degree of pore size uniformity throughout the matrix. Likewise, their pores provide a very tortuous path through the matrix. As a result, these sponges have pockets of small pores which entrap the liquid reactant and prevent its migration by capillary action toward the electrode's working surface. These pockets of reactant are then only electrochemically consumed at the expense of longer ionic current paths resulting in unnecessary losses within the cell. Likewise, the tortuous nature of the pores inhibits the aforesaid capillary migration. The electrode of my invention has closely controlled pore sizes as well as substantially nontortuous direct flow paths for the reactant's capillary migration from within the interstices of the matrix to its working electrode surface.

Accordingly, it is an object of this invention to provide an improved matrix electrode having a controlled pore size distribution throughout and an ordered arrangement of substantially nontortuous continuous pores for virtually eliminating the entrapment of pockets of liquid reactant within the matrix and providing direct capillary flow paths from within the interstices of the electrode to its working surface.

Briefly stated, the subject invention is an improved electrode for containing, and providing an electrochemical reaction situs for, a liquid reactant of an electrochemical couple and cells particularly adapted for use with such an electrode. The electrode is a matrix comprised of a porous bundle of filaments. The word bundle herein is being used to describe a collection of filaments which are assembled and bound together in a substantially ordered and regular arrangement. The particular arrangement can be varied to meet particular cell requirements as indicated by the several embodiments hereinafter discussed. The matrix holds the liquid reactant within its interstitial volume and beneath the surface of the electrolyte by surface tension. On cell discharge, and by capillary action, the matrix continuously feeds the reactant from within the matrix in a substantially nontortuous or direct manner to the electrode's working surface. The electrode's working surface contacts the electrolyte and serves as the situs of the electrochemical reaction. The reverse occurs on cell recharge. The material forming the matrix is preferentially wetted by the liquid reactant when considered in relation to its wettability by the electrolyte. In its preferred form, the matrix bundle is comprised of spacer filaments which are intermittently disposed between layers of woven or meshed filaments such as are characteristic of wire screen. The preferred matrix bundle is formed by rolling into a coil a strip of wire screen which has a plurality of additional filaments spaced apart along its length. Upon coiling, the additional filaments act as spaces between the respective layers of the coil. Matrices of controlled porosity, pore size and shape are thus formed. By varying the filament lengths, diameters and/or spacing, porosity and pore size gradients can be effected. Filament bundles of the type which will be described in more detail hereafter are made simply and inexpensively.

Figure 1:
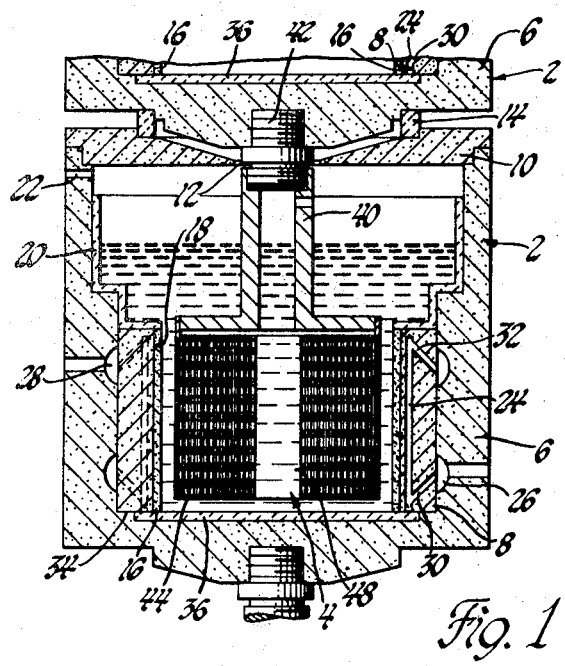
FIG. 1 is a sectional view of a portion of a battery of cells wherein each cell has a matrix electrode pendant from the next superjacent cell.

FIG. 1 depicts a battery of electrochemical cells which cells are particularly adapted for stacking in a manner which provides a series electrical connection between the cells and simplifies the sealing of the respective cells. The particular FIG. 1 fuel battery shown relates to a fused salt lithium|lithium chloride|chlorine fuel cell but, of course, the principles applied therein are not necessarily limited thereto. In this regard, for example, other electrochemical couples may be used with these cells (e.g. other alkali metal-halogen couples). Herein the matrix electrode is associated with the molten lithium. In addition to the use of a lithium matrix electrode, the cells of the FIG. 1 battery have several other features including ease and simplicity of assembly into batteries of like cells, without the need for complicated chlorine gas seals between the respective cells. This battery and its cells will be discussed in greater detail hereinafter. A particularly effective battery of cells is shown in FIG. 1.

The FIG. 1 battery cells 2 each have a matrix electrode 4 pendant from the cell housing 6 of the next superjacent cell in the battery. The pendant matrix 4 extends through a central opening 12 in the cell housing cover 10. The cell housing 6 and its cover 10 are comprised of dense graphite and are in direct electrical contact with the chlorine electrode 8.

Matrix electrode 4 is suspended in the lithium chloride electrolyte pool by a stainless steel flanged support 40. A threaded molybdenum stud 42 joins the stainless steel support 40 to the bottom of the next superjacent cell housing 6. The stud 42 provides the electrical connection between the flanged support 40 and the housing 6. The molybdenum stud 42 provides a joint which is more compatible with the coefficient of thermal expansion of the graphite than is the stainless steel 40 at the 600–650° C. operating temperature of the cell. The cell housing cover 10 and the cell housing 6 of the next superjacent cell are electrically separated one from the other by means of the ceramic ring 14. Stacking of the cells, as shown in FIG. 1, provides a series connected battery of cells. However, to insure this, lithium chloride must be kept away from the ceramic ring 14 if shorting of the battery is to be prevented. Were the lithium chloride to contact the ceramic ring 14, the ring would become conductive and short the battery. Lithium chloride is prevented from reaching the ceramic ring 14 by the cover 10 which is comprised of a material which is not wettable by LiCl. In this case, that material is graphite which is needed to resist $Cl_2$ attack. However, were there not a $Cl_2$ corrosion problem other materials could also be used. Thus, lithium chloride cannot creep toward the ceramic ring 14 because of the interposition of this non-LiCl wettable barrier (e.g. cover 10).

In the cell 2 the chlorine electrode 8 is placed in a circumscribing relation to the lithium matrix electrode 4. The chlorine electrode 8 is comprised of porous carbon and has a plurality of passages 24 immediately subjacent the working surface 18. Passages 24 communicate with $Cl_2$ inlet and $Cl_2$ outlet manifolds 26 and 28, respectively, by means of $Cl_2$ electrode inlet and outlet channels 30 and 32 respectively. $Cl_2$ is supplied and withdrawn from the cell via these various conduits. Passages 24 are conveniently formed in the electrode 8 by boring slightly behind the working surface 18 from either end (e.g., 34) of the chlorine electrode. An appropriate cement, not shown, seals the open end of the bore. The channels 30 and 32 are also bored into the back electrode so as to meet the passages 24.

Figure 2:
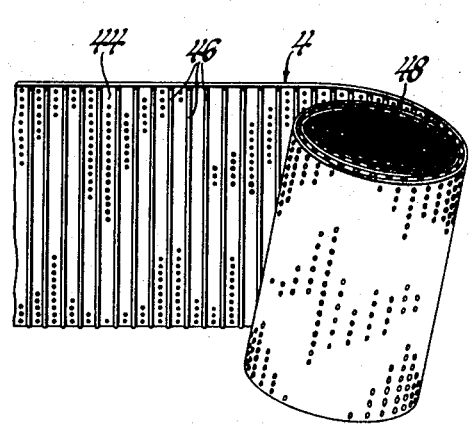
FIG. 2 is a perspective view of a coiled matrix electrode.
Figure 7:
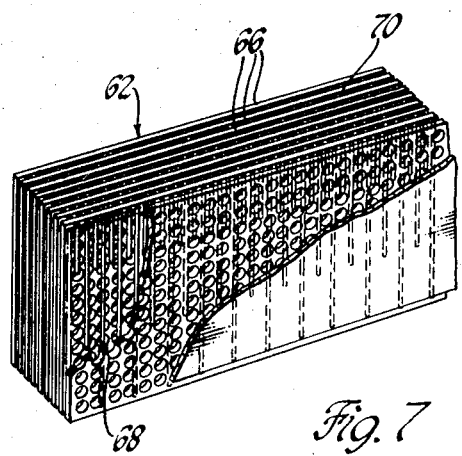
FIG. 7 is a perspective view of a matrix such as might be used in conjunction with the cell of FIG. 6.
Figure 9:
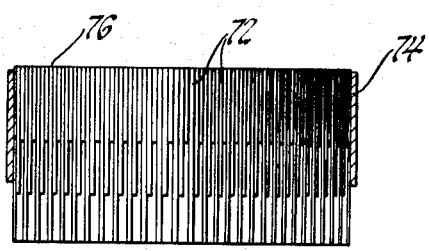

FIG. 2 shows a preferred matrix electrode 4 for use with cells such as shown in FIG. 1. The electrode 4, of FIG. 2, is made from a strip of wire screen 44 and has a plurality of additional filaments 46 spaced apart along its length. As will be discussed hereafter and as shown in FIGS. 7 and 9, these filaments may vary in length if desired. The strip is rolled into a coil such that there are formed a number of layers of screen which are spaced one from the other by means of the additional filaments disposed between the layers. It is preferred to attach the additional filaments to the screen by spot-welding. However, other bonding techniques are acceptable. One particular matrix constructed and successively used in conjunction with a battery of the FIG. 1 type was made from a 70 x 80 mesh, 316 stainless steel twill 44. This twill 44 was cut into long strips 2½" wide. Across these strips, 0.016" diameter 316 stainless steel wires were spot-welded at intervals of about 3/16 of an inch. The strip was coiled. After coiling, the bundle outside diameter was about 2⅞ inches with a center opening 48 of about ¾ of an inch in diameter. The capillaries in the axial direction of this coil were straight and about 0.016" x 0.17" x 2.5" in size. The capillaries in the radial direction were relatively straight and substantially non-tortuous when compared to fiber metal sponges. By varying the size and weave of the screen, as well as the size of the filaments used to weave it, and by varying the size and spacing of the additional filaments, virtually any porosity, pore size and capillary configuration can be built into the matrix. It is this design flexibility and pore size control as well as the simplicity of its manufacture and excellent performance characteristics, that has made these electrodes so desirable.

Figure 3:
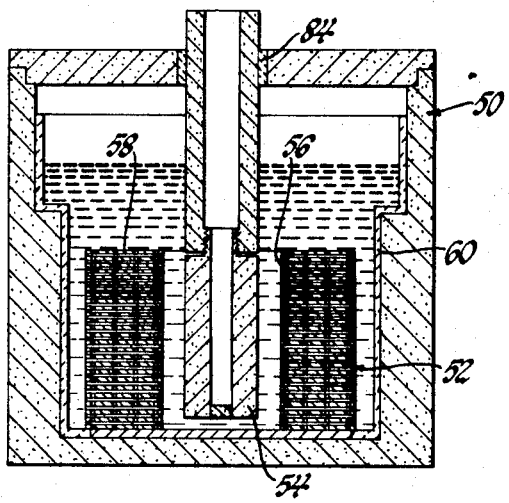
FIG. 3 is a sectional view of another cell embodiment having another matrix electrode embodiment.
Figure 4:
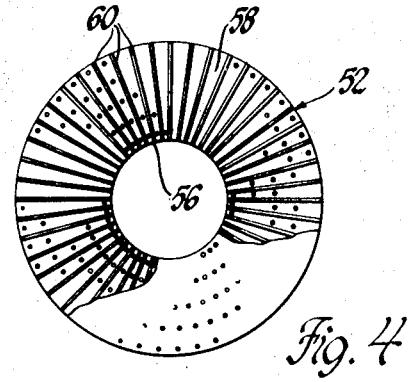
FIGS. 4 and 5 are top and side views, respectively, of a matrix such as might be used in conjunction with the cell of FIG. 3.
Figure 5:
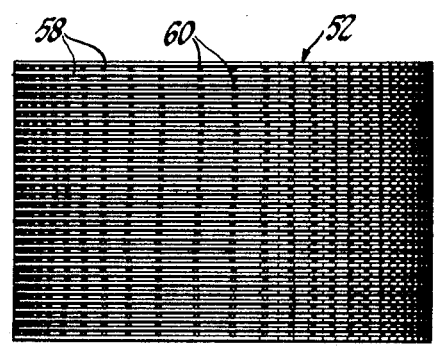

FIG. 3 depicts generally a cell 50 wherein the lithium matrix electrode 52 circumscribes the $Cl_2$ counter-electrode 54. A ceramic insulation ring 84 electrically insulates the $Cl_2$ electrode from the lithium electrode 52. In this variation, a matrix electrode 52 such as is shown in FIGS. 4 and 5 may be used. Herein, the electrochemical reaction situs or working portion of the lithium electrode 52 is at the inside surface 56 of the annular matrix. In this embodiment, the matrix is comprised of a plurality of layers of screen 58 separated by the radially extending additional filaments 60, best shown in FIG. 4. A particular advantage of matrices made in this manner resides in the inherent porosity and pore size gradient which results from the radial disposition of the additional filaments 60. This downward gradient toward the working surface 56 better insures the flow of liquid reactant toward that surface during discharge of the cell.

Figure 6:
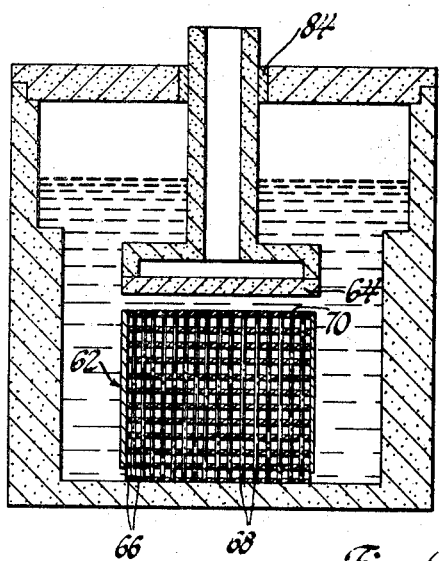
FIG. 6 is a sectional view of another cell embodiment having another matrix electrode embodiment.
Figure 8:
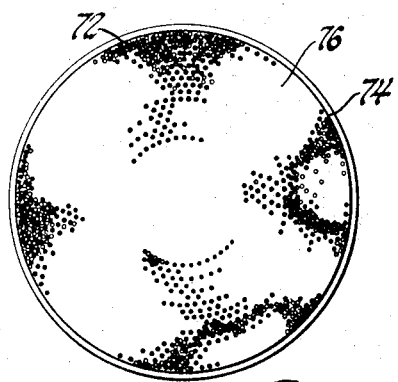
FIGS. 8 and 9 are top and side views, respectively, of another matrix electrode embodiment.
Figure 10:
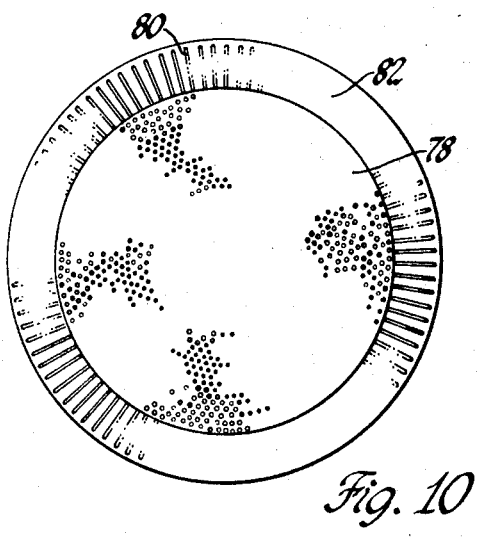
FIGS. 10 and 11 are top and side views, respectively, of another matrix electrode embodiment.
Figure 11:
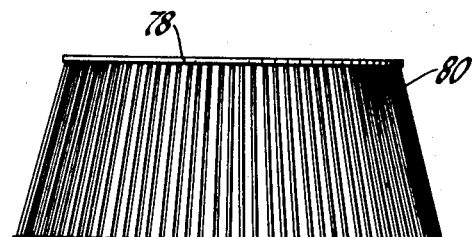

FIGS. 6 through 11 depict generally still another cell arrangement and several matrices particularly adapted to use therewith. FIG. 6 depicts a cell wherein the lithium matrix electrode 62 is submerged in the electrolyte beneath the $Cl_2$ counterelectrode 64. A ceramic insulator ring 84 electrically insulates the $Cl_2$ electrode from the lithium electrode 62. In FIG. 7, the matrix electrode 62 has a plurality of layers of perforated plates 66 or screen, not shown, separated one from the other by the filaments 68. It is preferred to use screen having a higher percentage of voids than solids in order to provide the maximum storage capacity for the lithium. The filaments 68 may vary in length so as to have smaller voids or pores at the electrode's working surface 70. Varying the filament lengths, as shown, provides a pore size reduction in the direction of the working surface 70. In FIGS. 8 and 9 the matrix comprises a plurality of filaments 72, of varying lengths, which are bundled together and held in place by a means such as the strap 74. Like the FIG. 7 embodiment, the working surface 76 of this embodiment has smaller pores than the rest of the matrix. In this particular embodiment, no screen or mesh is used. Where no pore size gradient is desired, bundles comprised of filaments of the same length can be made and used in this manner. In FIGS. 10 and 11 the matrix electrode has a porous plate or mesh 78 with a plurality of filaments 80 bonded thereto, as by spot welding. The porous plate 78 serves as the working surface of the electrode. A pore size gradient may be provided by flaring the filaments 80 outwardly from the plate 78, as shown. A bottom plate 82 may be provided for bonding the filaments in place. In the alternative, the upper ends of the filaments 80 could be strapped together, as shown in FIG. 9, and the bottom ends flare outwardly and held in that relation in any convenient manner.

There are other advantages to the battery shown in FIG. 1. In addition to electrically insulating the respective cells from each other, the ring 14 provides a gas seal for each cell. Lapping of the ring and its graphite seats in the housing 6 and cover 10 virtually eliminates chlorine leakage when the cells are clamped together. No additional gas sealing means, e.g., cement, is necessary. In combination with ring seal 14, chlorine leakage is reduced by minimizing any unnecessary $Cl_2$ evolution in the cell. This is accomplished in two ways. First, the chlorine electrode 8 has a thin porous ceramic layer 16 on its working surface 18. The nature and function of this porous ceramic 16 is clearly disclosed in copending United States patent application Ser. No. 550,514, filed May 16, 1966 in the name of Dominicus A. J. Swinkels and assigned to the assignee of this invention. The aforesaid copending patent application Ser. No. 550,514 is intended to be incorporated by reference herein. Second, a thin impervious layer of ceramic 20 is provided inside the cell, as by spraying, on all other electrically conductive surfaces except the cover 10, which are at the chlorine electrode potential. The impervious coating 20 inhibits chlorine generation during recharge except at the working surface 18 of the chlorine electrode 8. Any small amounts of chlorine which might escape into the cell are removed by purging with an inert gas or venting the cell through the vent 22. A ceramic plate 36, like the coating 20, electrically insulates the lithium chloride pool from the conductive housing 6 and $Cl_2$ evolution thereat is accordingly inhibited. The plate 36 also reduces $Cl_2$ leakage past the $Cl_2$ electrode 8 during discharge of the cell.

While this invention has been disclosed primarily in terms of specific embodiments thereof, it is not intended that the scope of the invention be limited thereto, except as defined by the appended claims which follow.

I claim:

1. In a high temperature electrochemical cell having a fused electrolyte and an electrochemical couple comprising a fused reactant and a counterreactant and wherein said fused reactant is substantially immiscible with said fused electrolyte, said cell comprising a housing, a matrix electrode containing said fused reactant and another electrode for said counter-reactant, said electrodes being spaced apart in said housing and beneath the surface of said electrolyte, the improvement wherein said matrix electrode comprises a porous body having a large interstitial volume containing said fused reactant by capillary attraction and a working surface providing an electrochemical reaction situs for said fused reactant, said body comprising a bundle of filaments composed of a material which is wetted more by said fused reactant than by said electrolyte, said filaments being arranged in said bundle in a predetermined and orderly manner providing ordered, substantially direct, capillary flow paths from within the interstices of said body to its working surface.

2. In a high temperature electrochemical cell having a fused electrolyte and an electrochemical couple comprising a fused reactant and a counterreactant and wherein said fused reactant is substantially immiscible with said fused electrolyte, said cell comprising a housing, a matrix electrode containing said fused reactant and another electrode for said counter-reactant, said electrodes being spaced apart in said housing and beneath the surface of said electrolyte, the improvement wherein said matrix electrode comprises a porous body having a large interstitial volume containing said fused reactant by capillary attraction and a working surface providing an electrochemical reaction situs for said fused reactant, said body comprising a bundle of filaments composed of a material which is wetted more by said fused reactant than by said electrolyte and wherein said filaments are spacers between layers of screen providing ordered, substantially direct, capillary flow paths from within the interstices of said body to its working surface.

3. The cell as defined in claim 2 wherein said screen comprises woven filaments.

4. In a high temperature electrochemical cell having a fused electrolyte and an electrochemical couple comprising a fused reactant and a counterreactant and wherein said fused reactant is substantially immiscible with said fused electrolyte, said cell comprising a housing, a matrix electrode containing said fused reactant and another electrode for said counter-reactant, said electrodes being spaced apart in said housing and beneath the surface of said electrolyte, the improvement wherein said matrix electrode comprises a porous body having a large interstitial volume containing said fused reactant by capillary attraction and a working surface providing an electrochemical reaction situs for said fused reactant, said body comprising a bundle of filaments composed of a material which is wetted more by said fused reactant than by said electrolyte, wherein a portion of said filaments are spacers between the layers of a coiled screen and the balance of said filaments are woven into said screen.

5. The cell as defined in claim 4 wherein said electrolyte comprises fused lithium chloride, said fused reactant is molten lithium, and said counter-reactant is gaseous chlorine.

6. In a high temperature electrochemical cell having a fused electrolyte and an electrochemical couple comprising a fused reactant and a counterreactant and wherein said fused reactant is substantially immiscible with said fused electrolyte, said cell comprising a housing, a matrix electrode containing said fused reactant and another electrode for said counter-reactant, said electrodes being spaced apart in said housing and beneath the surface of said electrolyte, the improvement wherein said matrix electrode comprises a porous body having a large interstitial volume containing said fused reactant by capillary attraction and a working surface providing an electrochemical reaction situs for said fused reactant, said body comprising a bundle of filaments composed of a material which is wetted more by said fused reactant than by said electrolyte, and wherein said filaments vary in length from one to the other and are arranged in said bundle such that at least one end of each of said filaments is on the working surface of said electrode.

7. In a high temperature electrochemical cell having a fused electrolyte and an electrochemical couple comprising a fused reactant and a counterreactant and wherein said fused reactant is substantially immiscible with said fused electrolyte, said cell comprising a housing, a matrix electrode containing said fused reactant and another electrode for said counter-reactant, said electrodes being spaced apart in said housing and beneath the surface of said electrolyte, the improvement wherein said matrix electrode comprises a porous body having a large interstitial volume containing said fused reactant by capillary attraction and a working surface providing an electrochemical reaction situs for said fused reactant, said body comprising a bundle of filaments composed of a material which is wetted more by said fused reactant than by said electrolyte, and wherein each of said filaments has at least one of its ends fixed in a closely spaced relation to at least one end of others of said filaments and each of said filaments has the other of its ends flared outwardly from said one end, said other ends of said filaments being spaced farther apart than said one ends to provide a pore size gradient in said interstitial volume which decreases in the direction of said one end.

8. A battery of alkali metal|alkali metal halide|halogen electrochemical cells stacked one atop the other wherein each of said cells comprises an electrically conductive container, having side and bottom walls, a cavity in said container defined by said side and bottom walls, a closure means for said container, a first electrode containing said alkali metal by capillary attraction, and a second electrode for said halogen, said first electrode being in electrical contact with and pendant from said container of the next superjacent cell in said battery, said first electrode comprising a multi-layer coil of porous screen having filaments intermittently disposed between said layers and composed of a material which is wetted more by said alkali metal than by said halide, said coil having an electrochemical working surface, said second electrode circumscribing said first electrode and having an electrochemical working surface spaced from said electrochemical working surface of said coil, said working surface of said second electrode having a thin porous layer of ceramic thereover, the inner surfaces of said walls of said cavity having a thin substantially impervious layer of ceramic thereover to substantially eliminate the evolution of said halogen thereat, the bottom container wall of each superjacent cell being said closure member for the next subjacent cell, said containers of said subjacent cells being electrically insulated from said bottom wall of said superjacent cell by a graphite-ceramic-graphite seal in which the graphite prevents electrical shorting of the battery through the ceramic which would otherwise result from contact between the ceramic and said alkali metal halide.

No references cited.

WINSTON A. DOUGLAS, Primary Examiner

H. A. FEELEY, Assistant Examiner